E. U. GIBBS.
BEARING FOR HYDRAULIC TURBINE SHAFTS.
APPLICATION FILED SEPT. 7, 1921.

1,425,379.

Patented Aug. 8, 1922.

Eugene U. Gibbs, Inventor
By *[signature]*
Attorney

UNITED STATES PATENT OFFICE.

EUGENE U. GIBBS, OF YORK, PENNSYLVANIA, ASSIGNOR TO S. MORGAN SMITH COMPANY, OF YORK, PENNSYLVANIA, A CORPORATION OF PENNSYLVANIA.

BEARING FOR HYDRAULIC-TURBINE SHAFTS.

1,425,379.      Specification of Letters Patent.      Patented Aug. 8, 1922.

Application filed September 7, 1921. Serial No. 499,098.

*To all whom it may concern:*

Be it known that I, EUGENE U. GIBBS, a citizen of the United States, residing at York, in the county of York and State of Pennsylvania, have invented new and useful Improvements in Bearings for Hydraulic-Turbine Shafts, of which the following is a specification.

This invention relates to a bearing for use on hydraulic turbine shafts and particularly to an adjustable guide bearing of the cone type, and the object of the invention is to provide a bearing of this class operative with a tapered or cone section formed as an integral part of the shaft and having very simple and easily controllable means for taking up wear and moving the bearing parallel with the center of the shaft.

A common fault of the bearings ordinarily used on hydraulic turbine shafts is that such bearings are subject to great wear and, where the bearing is permitted to run until the wear reaches such proportions as to be detrimental to the turbine runner and its running joints, it is necessary to stop the turbine, remove the bearing, and fit a new lining in order to take up the wear. Where a spare lining is not kept on hand it is necessary to shut down the turbine until a new lining can be procured.

One of the objects of this invention is to produce a bearing which may be adjusted to take up wear while the turbine or other machine supported by the bearing is in operation, and thus avoid the necessity of shutting down the machine in order to take up wear in the bearing.

The invention consists in the construction and arrangement of the several parts which will be more fully hereinafter described and claimed.

In my companion application executed of even date herewith, a similar bearing is disclosed wherein a bronze or other suitable metal sleeve with a straight central bore is applied to a hydraulic turbine shaft of the usual form, or longitudinally straight throughout its full length, the sleeve having an outer tapered or cone surface with which the remaining bearing elements are associated. In the present improvement the sleeve is omitted and a cone section or surface is formed integrally with the turbine shaft and directly engaged by lignum vitæ bearing strips, and thereby the bearing as a whole is materially simplified in its structural organization.

Figure 1:
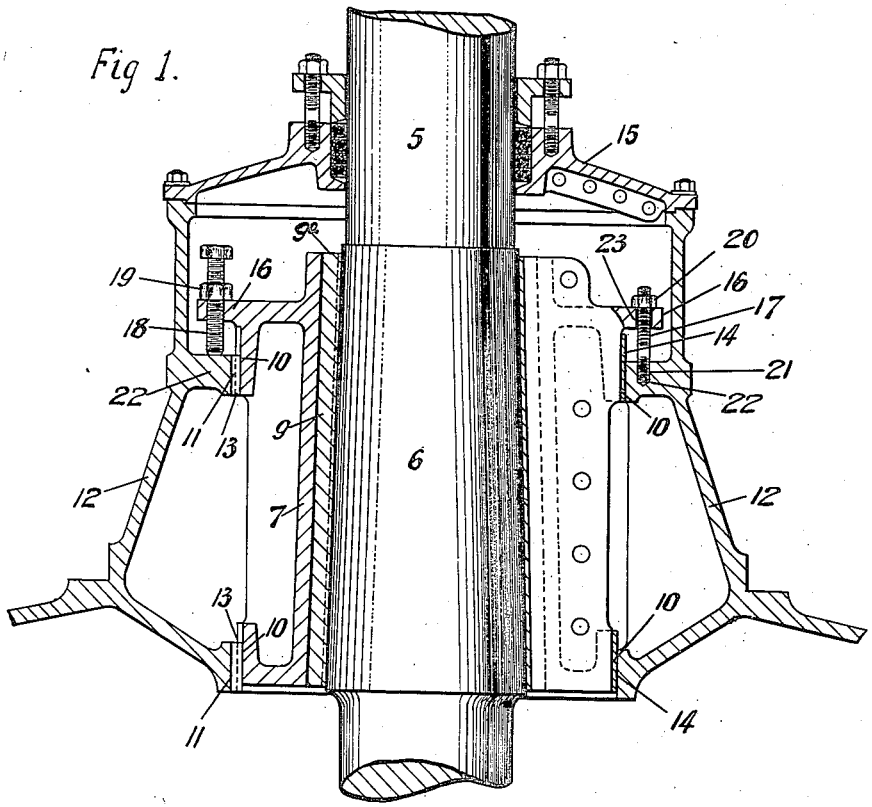
Fig. 1 is a transverse section through the upper part of the enclosing frame of a hydraulic turbine, showing the improved bearing applied to a part of the turbine shaft, the section being taken on the line 1—1, Fig. 2.
Figure 2:
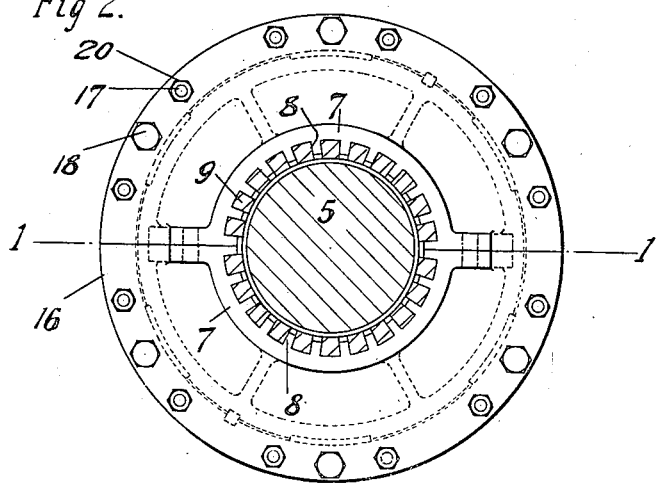
Fig. 2 is a horizontal section through a turbine shaft and part of the bearing.

The numeral 5 designates a hydraulic turbine shaft which will be operated as usual and in the present instance has a tapered or cone section 6 of a suitable length, the taper or divergence of this section being towards the lower extremity of the shaft. Mounted on the shaft is a bearing 7, preferably made of cast-iron in halves and bolted together, and has spaced grooves 8 in the inner bore thereof to receive lignum vitæ strips 9 of the form clearly shown by Fig. 2, these strips extending the full length of the bearing 7. The inner bore of the bearing 7 is downwardly tapered, as at $9^a$, and this taper is also formed in the grooves 8, so that the lignum vitæ strips 9 have a corresponding tapered disposition or may be turned and finished conical, to snugly engage and correspond to the outer tapered surface of the section 6 of the shaft 5. The outer surfaces 10 of the bearing 7 are cylindrical and fit in a corresponding bore 11 of a stationary frame 12, as shown by Fig. 1, and which provides a supporting enclosure for the bearing. The frame 7 is prevented from rotating within the frame 12 by keys 13 introduced between the said frames, as shown by Fig. 1. The keys 13 permit the frame 7 to slide parallel with the shaft 5, but prevent rotation of the said frame 7. Where the surfaces of the frame 7 come into contact with portions of the frame 12, as shown at the right of Fig. 1, bronze facing strips 14 are interposed, to prevent the contiguous surfaces of the frames 7 and 12 from rusting and sticking together. A cover plate 15 is applied to the frame 12 as shown, to serve as a closure for a purpose which will be presently explained. The frame 7 has an outwardly projecting flange member 16 carrying screw studs 17 and set screws 18 arranged as shown by Fig. 2 around the said flange 16, the set screws 18 being provided with set nuts 19 and the screw studs 17 having adjusting nuts 20. The screw studs 17 are terminally seated in screw bores 21 formed in an annular shoulder 22 of the frame 12, the said studs 17 also loosely extending through bores 23 in the flange 16.

The improved bearing is of the water lubricated type and the cover plate 15 is firmly secured in position as shown in Fig. 1, to prevent the water from overflowing out of the bearing. This cover plate is a well known structure in turbine organizations and forms no part of the present invention.

When the wood surfaces or the inner edges of the lignum vitæ strips 9 become worn and the bearing on the shaft can move out of its normal position due to such wear, the adjustment of the parts of the bearing to take up or compensate for wear is accomplished through the set screws 18 and screw studs 20. The set screws 18 are first slackened off by loosening the nuts 19 thereof and the studs 17 are drawn down and the bearing or bearing frame 7 is shifted longitudinally and parallel to the axis of the shaft 5 and is then set by manipulation of the screws and screw studs, to bring the inner surfaces of the lignum vitæ strips uniformly in contact with the tapered or conical section 6 of the shaft 5, thus eliminating the space between the said section 6 and the inner edges of the lignum vitæ strips 9. By this simple operation the bearing will be restored to its normal condition and may be repeated when found necessary to compensate for wear of the strips 9, with material advantage in the operation of the shaft 5.

What is claimed as new is:

1. In a bearing of the class specified, the combination of a shaft having an intermediate tapered section forming an integral part thereof, an outer fixed frame, and an intermediate frame slidably adjustable in the fixed frame and having an inner regularly tapered side formed with longitudinal grooves extending the full length thereof and surrounding the tapered section of the shaft and provided with wood strips with inner tapered edges directly bearing upon said tapered shaft section.

2. In a bearing of the class specified, a shaft having a tapered section of greater diameter than the shaft and forming an integral part thereof, a frame slidably surrounding and held against rotation relatively to the said tapered section of the shaft, means carried by the inner side of the frame having inner tapered edges directly bearing upon the tapered section of the shaft, an outer fixed frame, and adjusting means interposed between the outer fixed frame and the sliding frame and engaging outer side portions of the latter frame.

3. In a bearing of the class specified, a shaft having a tapered section of greater diameter than the shaft and forming an integral part thereof, an outer fixed frame, and an intermediate frame surrounding the shaft interposed between the fixed frame and tapered section of the shaft and having sliding adjustment but held against rotation relatively to the fixed frame, longitudinally disposed lignum vitæ strips arranged in spaced relation at the inner side of the said intermediate frame and having inner tapered edges bearing on the tapered shaft section, and means for adjusting the said intermediate frame and the lignum vitæ strips.

4. In a bearing of the class specified, a shaft having an integral tapered section of greater diameter than the shaft and a slidably adjustable frame completely surrounding the tapered section of the shaft and having longitudinally disposed spaced lignum vitæ strips provided with inner tapered edges corresponding in taper to and engaging the conical section of the shaft.

In testimony whereof I have hereunto set my hand in presence of two subscribing witnesses.

EUGENE U. GIBBS.

Witnesses:
MARY GATES,
M. J. RAFFENSBERGER.